United States Patent
Lee et al.

(10) Patent No.: US 11,165,113 B2
(45) Date of Patent: Nov. 2, 2021

(54) POUCH-SHAPED BATTERY CELL HAVING PROTECTIVE FILM ATTACHED THERETO

(71) Applicant: LG CHEM, LTD., Seoul-si (KR)

(72) Inventors: Hyun Hwa Lee, Daejeon (KR); In Gu An, Daejeon (KR); Jae Han Jung, Daejeon (KR); Eun Seok Choi, Daejeon (KR)

(73) Assignee: LG Chem, Ltd., Seoul-si (KR)

( * ) Notice: Subject to any disclaimer, the term of this patent is extended or adjusted under 35 U.S.C. 154(b) by 17 days.

(21) Appl. No.: 15/918,257

(22) Filed: Mar. 12, 2018

(65) Prior Publication Data

US 2018/0269436 A1    Sep. 20, 2018

(30) Foreign Application Priority Data

Mar. 14, 2017   (KR) .......................... 10-2017-0031834

(51) Int. Cl.
*H01M 50/116* (2021.01)
*H01M 50/10* (2021.01)
(Continued)

(52) U.S. Cl.
CPC ......... *H01M 50/116* (2021.01); *H01M 50/10* (2021.01); *H01M 50/103* (2021.01);
(Continued)

(58) Field of Classification Search
CPC .. H01M 2/0267; H01M 2/0207; H01M 2/026; H01M 2/0287; H01M 2/06;
(Continued)

(56) References Cited

U.S. PATENT DOCUMENTS

| 7,910,243 B2 | 3/2011 | Koh et al. |
| 8,449,999 B2 | 5/2013 | You et al. |

(Continued)

FOREIGN PATENT DOCUMENTS

| KR | 10-2007-0075705 A | 7/2007 |
| KR | 10-2008-0087959 A | 10/2008 |

(Continued)

OTHER PUBLICATIONS

English Translation of KR 20090004355 A (Year: 2009).*
Korean Office Action dated Jun. 17, 2019, issued in counterpart Korean Patent application No. 10-2017-0031834.

*Primary Examiner* — Christopher P Domone
*Assistant Examiner* — Kimberly Wyluda
(74) *Attorney, Agent, or Firm* — Morgan, Lewis & Bockius LLP

(57) ABSTRACT

Disclosed herein is a pouch-shaped battery cell configured to have a structure in which an electrode assembly is received in a pouch-shaped battery case together with an electrolytic solution, wherein the pouch-shaped battery case is made of a laminate sheet including a metal layer and a resin layer, an upper edge of the pouch-shaped battery case, from which electrode terminals protrude outward, and opposite side edges of the pouch-shaped battery case, which are adjacent to the upper edge of the pouch-shaped battery case, are thermally fused to constitute a sealed portion of the pouch-shaped battery case, the opposite side edges of the pouch-shaped battery case being bent perpendicularly from the upper edge of the pouch-shaped battery case toward an electrode assembly receiving unit for receiving the electrode assembly, and a protective film is attached so as to wrap the perpendicularly bent opposite side edges of the pouch-shaped battery case.

5 Claims, 5 Drawing Sheets

(51) Int. Cl.
  *H01M 50/124* (2021.01)
  *H01M 50/172* (2021.01)
  *H01M 50/103* (2021.01)
  *H01M 50/543* (2021.01)
  *H01M 50/557* (2021.01)

(52) U.S. Cl.
  CPC ....... *H01M 50/124* (2021.01); *H01M 50/172* (2021.01); *H01M 50/543* (2021.01); *H01M 50/557* (2021.01); *H01M 2220/30* (2013.01)

(58) Field of Classification Search
  CPC .. H01M 2/30; H01M 2/0292; H01M 2220/30; H01M 50/116; H01M 50/124; H01M 50/543; H01M 50/103; H01M 50/172; H01M 50/10; H01M 50/557
  See application file for complete search history.

(56) References Cited

U.S. PATENT DOCUMENTS

| | | | |
|---|---|---|---|
| 2006/0083984 A1* | 4/2006 | Oh | B32B 3/26 429/176 |
| 2008/0286644 A1 | 11/2008 | Yeo | |
| 2010/0266881 A1 | 10/2010 | You et al. | |

FOREIGN PATENT DOCUMENTS

| | | |
|---|---|---|
| KR | 10-2008-0094602 A | 10/2008 |
| KR | 10-0870354 B1 | 11/2008 |
| KR | 10-2009-0004355 A | 1/2009 |
| KR | 20090004355 A * | 1/2009 |
| KR | 10-2014-0043535 A | 4/2014 |

* cited by examiner

[FIG. 1]
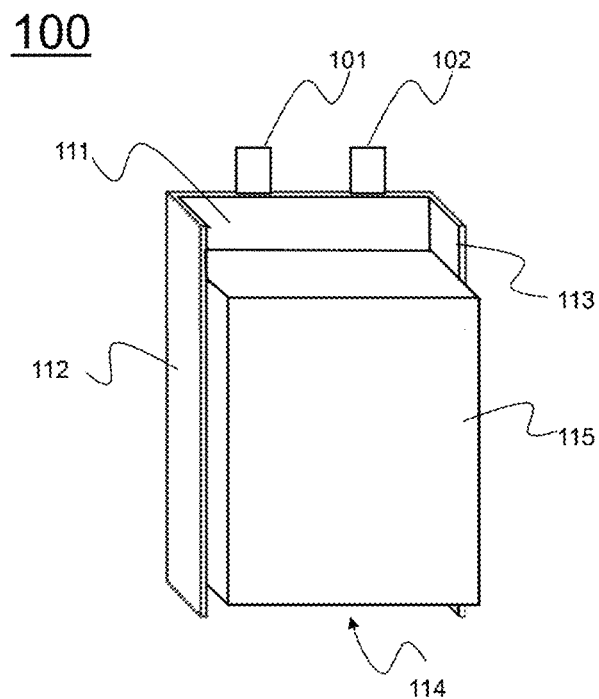
[FIG. 2]
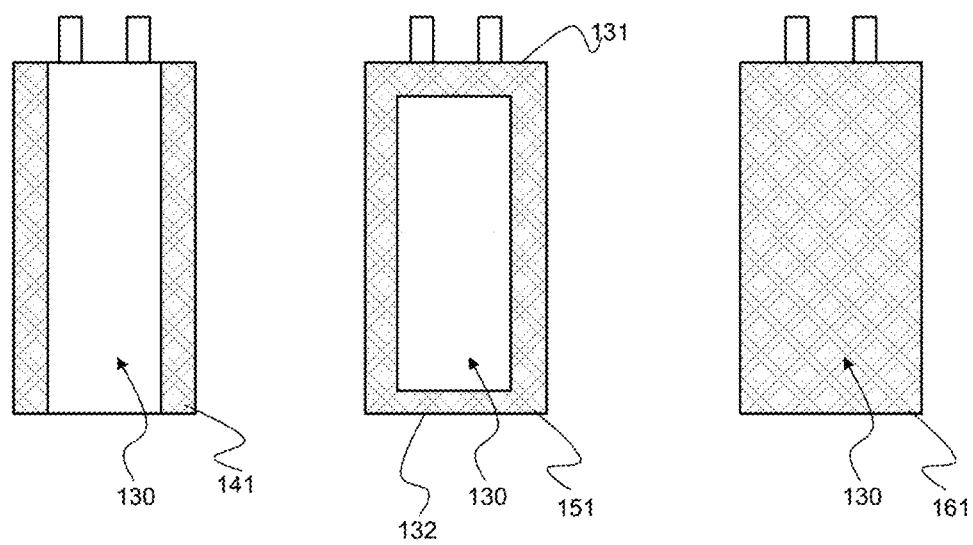

[FIG. 3]
210
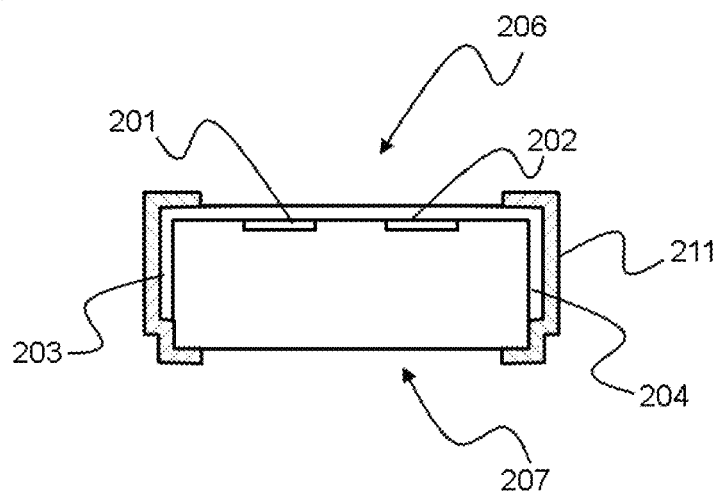
[FIG. 4]
220
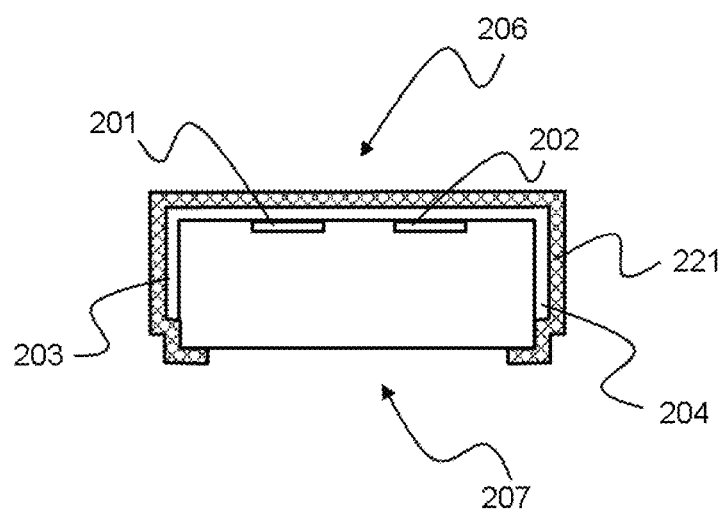

[FIG. 5]
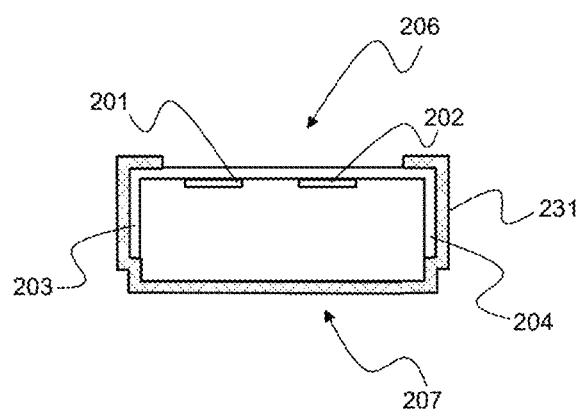
[FIG. 6]
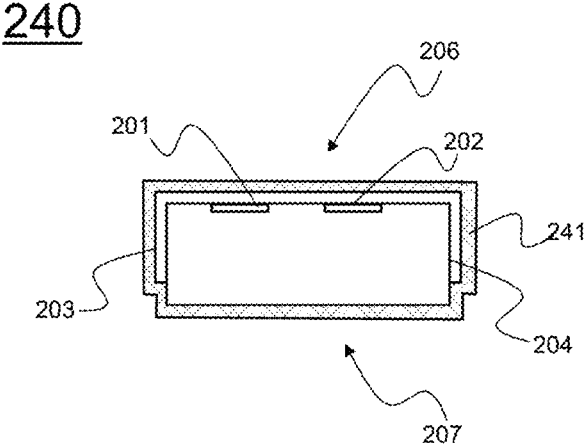

[FIG. 7]
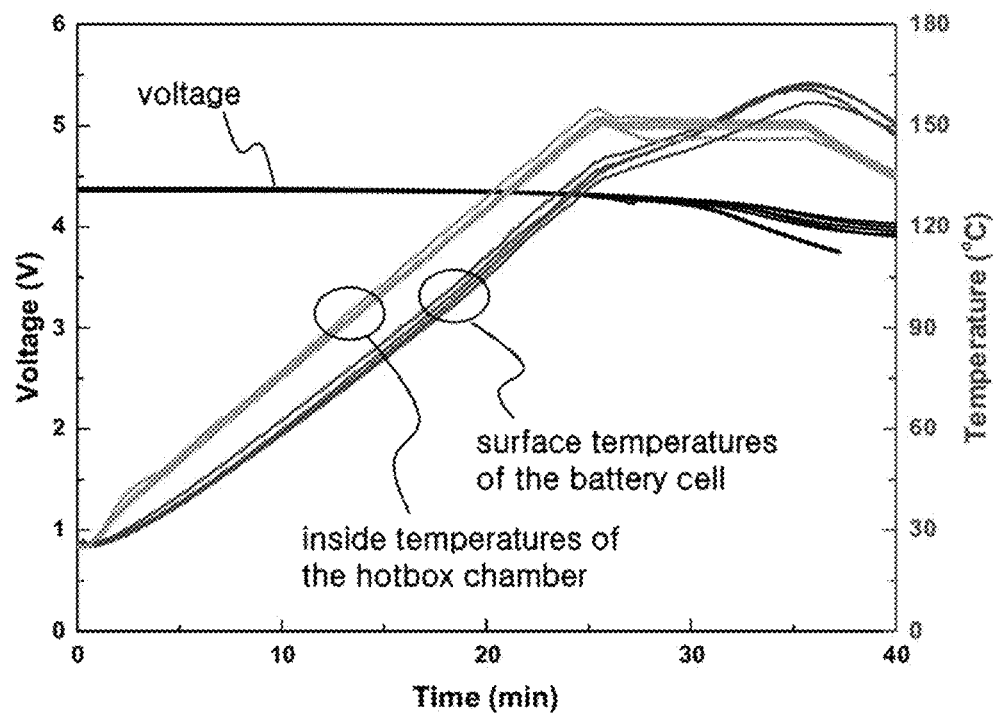
[FIG. 8]
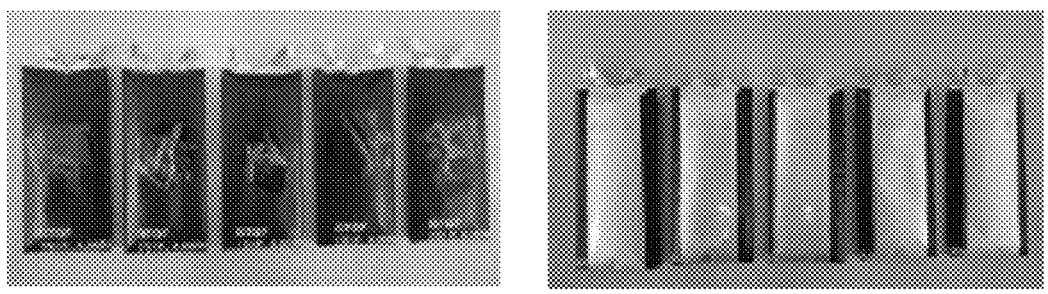

[FIG. 9]
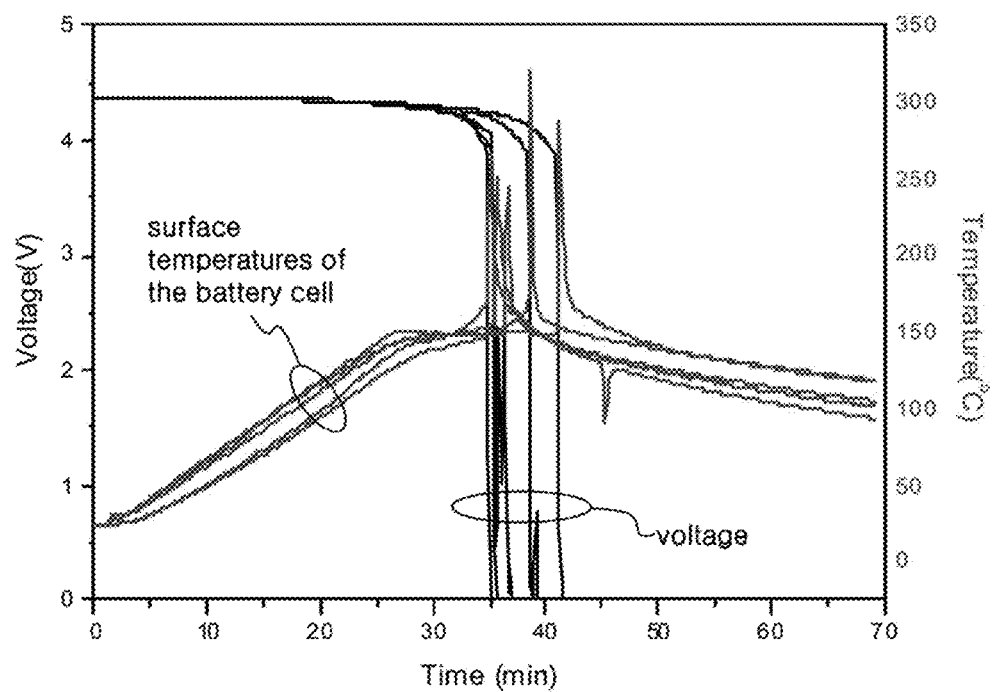
[FIG. 10]
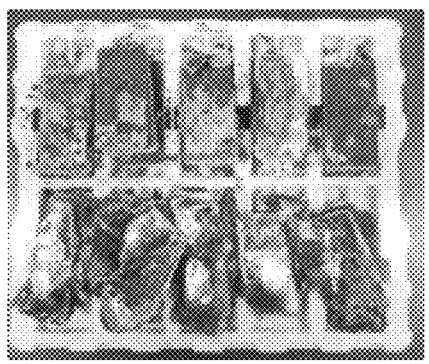

POUCH-SHAPED BATTERY CELL HAVING PROTECTIVE FILM ATTACHED THERETO

The present application claims the benefit of Korean Patent Application No. 10-2017-0031834, filed in Korea on Mar. 14, 2017, which is hereby incorporated by reference.

BACKGROUND

Technical Field

The present invention relates to a pouch-shaped battery cell having a protective film attached thereto.

Discussion of the Related Art

As mobile devices have been continuously developed and the demand for such mobile devices has increased, the demand for secondary batteries as energy sources for such mobile devices has also sharply increased. Accordingly, much research into batteries satisfying various needs has been carried out.

Typically, in terms of the shape of batteries, the demand for prismatic batteries or pouch-shaped batteries that are thin enough to be applied to products, such as cellular phones, is very high. In terms of the material for batteries, on the other hand, the demand for lithium secondary batteries, such as lithium cobalt polymer batteries, which exhibit high energy density, discharge voltage, and output stability, is also very high.

A lithium secondary battery includes an electrode assembly constituted by a positive electrode plate, a separator, and a negative electrode plate, which are sequentially stacked, and a battery case for receiving the electrode assembly in a sealed state.

In general, a lithium secondary battery is configured to have a plate-shaped battery cell structure having a small thickness and a relatively large width and length in order to minimize the total size of the lithium secondary battery. A secondary battery configured to have a structure in which a plate-shaped electrode assembly is mounted in a pouch-shaped battery case made of a laminate sheet including a resin layer and a metal layer in the state in which the outer edge of the pouch-shaped battery case is sealed by thermal fusion is called a pouch-shaped battery cell.

Since the pouch-shaped battery case made of the laminate sheet exhibits lower strength than a prismatic or cylindrical battery case made of a metal material, the pouch-shaped battery case may be easily deformed by external impact. In addition, when the battery cell is stored at a high temperature, the battery cell may swell due to the evaporation of an electrolytic solution, whereby the internal structure of the battery cell may be deformed, and a short circuit may occur in the battery cell due to the shrinkage of the separator. As a result, the temperature of the battery cell may increase and the battery cell may catch fire, which reduces the safety of the battery cell.

In order to solve the above problems, the pouch-shaped battery cell is received in an external frame or an external case, whereby the outer surface of the battery cell is protected. However, such a related art method has problems in that the total size of the battery cell is increased and in that, when the battery cell is mounted in a limited space, the capacity of the battery cell is reduced due to the volume of additional protection members.

Therefore, there is a high necessity for technology that is capable of improving the safety of the battery cell while maximally utilizing the related art battery cell and the related art assembly method.

SUMMARY

Accordingly, embodiments of the present disclosure are directed to a pouch shaped battery cell having a protective film attached thereto that substantially obviates one or more of the problems due to limitations and disadvantages of the related art.

Objects of the present invention relate to solving the above problems and other technical problems that have yet to be resolved.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a pouch-shaped battery cell may be configured to have a structure in which an electrode assembly is received in a pouch-shaped battery case together with an electrolytic solution, wherein the pouch-shaped battery case is made of a laminate sheet comprising a metal layer and a resin layer, an upper edge of the pouch-shaped battery case, from which electrode terminals protrude outward, and opposite side edges of the pouch-shaped battery case, which are adjacent to the upper edge of the pouch-shaped battery case, are thermally fused to constitute a sealed portion of the pouch-shaped battery case, the opposite side edges of the pouch-shaped battery case being bent perpendicularly from the upper edge of the pouch-shaped battery case toward an electrode assembly receiving unit for receiving the electrode assembly, and a protective film is attached so as to wrap the perpendicularly bent opposite side edges of the pouch-shaped battery case.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated and constitute a part of this application, illustrate embodiments of the disclosure and together with the description serve to explain various principles. In the drawings:

FIG. 1 is a perspective view showing a battery cell according to an embodiment of the present invention;

FIG. 2 is a front view showing a plurality of battery cells, each of which has a protective film attached to a portion thereof including opposite side edges;

FIG. 3 is a plan view showing a battery cell having a protective film attached to opposite side edges thereof;

FIG. 4 is a plan view showing a battery cell having a protective film attached to opposite side edges and an upper edge thereof;

FIG. 5 is a plan view showing a battery cell having a protective film attached to opposite side edges and a lower edge thereof;

FIG. 6 is a plan view showing a battery cell having a protective film attached to opposite side edges, an upper edge, and a lower edge thereof;

FIG. 7 is a graph showing the results of tests on battery cells manufactured according to Example 1;

FIG. 8 is a photo showing the battery cells manufactured according to Example 1 after the tests on the battery cells have been carried out;

FIG. 9 is a graph showing the results of tests on battery cells manufactured according to Comparative Example 1; and FIG. 10 is a photo showing the battery cells manufactured according to Comparative Example 1 after the tests on the battery cells have been carried out.

DETAILED DESCRIPTION

Now, exemplary embodiments of the present invention will be described in detail with reference to the accompanying drawings. It should be noted, however, that the scope of the present invention is not limited by the illustrated embodiments.

FIG. 1 is a perspective view schematically showing a pouch-shaped battery cell according to an embodiment of the present invention.

Referring to FIG. 1, the battery cell, denoted by reference numeral 100, is a pouch-shaped battery cell made of a laminate sheet. The outer edges of an electrode assembly receiving unit 115 constitute a sealed portion of the battery cell, which is formed by thermal fusion. Opposite side edges 112 and 113, which are located at opposite sides of an upper edge 111, from which electrode terminals 101 and 102 protrude outward, are bent perpendicularly from the upper edge 111 toward the electrode assembly receiving unit 115. A protective film (not shown) is attached to the outer surface of the battery cell. The protective film may be attached to the opposite side edges 112 and 113, which are bent perpendicularly from the upper edge 111. Alternatively, the protective film may be selectively attached to the upper edge 111 and/or a lower edge 114.

FIG. 2 is a front view schematically showing a plurality of battery cells, each of which has a protective film attached to a portion thereof including opposite side edges.

Referring to FIG. 2, a protective film 141, 151, or 161 may be a one-unit film substrate that is attached to outer edges of the battery cell so as to wrap the outer edges of the battery cell. The protective film 141, 151, or 161 extends toward the front surface 130 of the battery cell while wrapping the outer edges of the battery cell. The protective film 141 extends toward the front surface 130 of the battery cell while wrapping only the opposite side edges of the battery cell. The protective film 151 extends toward the front surface 130 of the battery cell while wrapping all of the opposite side edges, the upper edge 131, and the lower edge 132 of the battery cell. On the other hand, the protective film may extend toward the front surface of the battery cell while wrapping the opposite side edges and the lower edge 132 of the battery cell.

Alternatively, the protective film 161 may be attached to the outer surface of a pouch-shaped battery case excluding the upper edge of the pouch-shaped battery case while wrapping the outer surface of the pouch-shaped battery case excluding the upper edge of the pouch-shaped battery case.

FIGS. 3 to 6 are plan views schematically showing battery cells, each of which has a protective film attached thereto, when each of the battery cells is viewed from the upper edge thereof.

Referring to FIGS. 3 to 6, a battery cell 210 is configured to have a structure in which a protective film 211 is attached to the outer surfaces of opposite side edges 203 and 204, which are located so as to be adjacent to the upper edge of the battery cell 210, from which electrode terminals 201 and 202 protrude outward, and are bent perpendicularly from the upper edge of the battery cell 210 toward an electrode assembly receiving unit, so as to wrap the outer surfaces of the opposite side edges 203 and 204. Although not shown, the protective film may or may not be attached to the lower edge of the battery cell 210 in consideration of swelling of the battery cell 210 based on the structure of an electrode assembly, the kind of an electrode active material, or the kind of an electrolytic solution. For example, in the case in which an upper case and a lower case constituting a battery case are connected to each other at the lower edge of the battery cell 210, no protective film may be attached to the lower edge of the battery cell 210. On the other hand, in the case in which the upper case and the lower case are separated from each other, the protective film may be attached to the lower edge of the battery cell 210.

A battery cell 220 is configured to have a structure in which a protective film 221 is attached to the opposite side edges 203 and 204 and the front surface 206 of the battery cell 220 so as to wrap the opposite side edges 203 and 204 and the front surface 206 of the battery cell 220. A battery cell 230 is configured to have a structure in which a protective film 231 is attached to the opposite side edges 203 and 204 and the rear surface 207 of the battery cell 230 so as to wrap the opposite side edges 203 and 204 and the rear surface 207 of the battery cell 230. A battery cell 240 is configured to have a structure in which a protective film 231 is attached to all of the opposite side edges 203 and 204, the front surface 206, and the rear surface 207 of the battery cell 240 so as to wrap the opposite side edges 203 and 204 and the rear surface 207 of the battery cell 240. Although not shown, the protective film may or may not be attached to the lower edge of each of the battery cells 220, 230, and 240 in consideration of swelling of the battery cell based on the structure of an electrode assembly, the kind of an electrode active material, or the kind of an electrolytic solution. For example, in the case in which an upper case and a lower case constituting a battery case are connected to each other at the lower edge of the battery cell, no protective film may be attached to the lower edge of the battery cell. On the other hand, in the case in which the upper case and the lower case are separated from each other, the protective film may be attached to the lower edge of the battery cell.

Hereinafter, the present invention will be described in more detail with reference to the following example. This example is provided only for illustration of the present invention, and should not be construed as limiting the scope of the present invention.

EXAMPLE 1

10 battery cells, each of which was configured to have a structure in which a stacked and folded type electrode assembly, including five unit cells wound so as to be separated from each other by a separation sheet, was received in a pouch-shaped battery case together with an electrolytic solution, were prepared. Five of the prepared battery cells were manufactured such that a protective film having a thickness of 50 μm was attached to the outer edges of each of the battery cells, excluding the upper edge thereof, from which electrode terminals protrude outward, and five of the prepared battery cells were manufactured such that a protective film having a thickness of 50 µm was attached only to the opposite side edges of each of the battery cells.

The 10 battery cells were received in a hotbox chamber, were heated to a temperature of 150° C. at a speed of 5° C./min, and were maintained at the temperature of 150° C. for 10 minutes.

At this time, each of the battery cells was charged with a constant current of 0.5 C (1 C=4,028 mA) until the voltage of each of the battery cells reached 4.4 V. After the voltage of each of the battery cells reached 4.4 V, each of the battery cells was charged with constant voltage until the cut-off current of each of the battery cells became 100 mA. At this time, a change in the temperature of each of the battery cells was measured. The results of measurements are shown in FIG. 7. The 10 tested battery cells are shown in FIG. 8.

Referring to FIGS. 7 and 8, the surface temperatures of the battery cells (indicated by red lines) reached 150° C. after the lapse of about 25 minutes. The inside temperatures of the hotbox chamber (indicated by green lines) reached 150° C. after the lapse of about 30 minutes, and then reached the maximum temperature, 175° C., at the lapse of about 35 minutes. It was observed that none of the 10 battery cells exploded or caught fire.

COMPARATIVE EXAMPLE 1

10 battery cells were manufactured using the same method as in Example 1 except that no protective film was attached to the outer surface of each of the battery cells, and the battery cells were tested under the same conditions as in Example 1. The results of temperature change tests are shown in FIG. 9. The 10 tested battery cells are shown in FIG. 10.

Referring to FIGS. 9 and 10, the surface temperatures of the battery cells reached 150° C. after the lapse of about 35 minutes. At this time, the battery cells exploded and caught fire, whereby the surface temperatures of the battery cells (indicated by red lines) abruptly increased to a maximum of about 330° C. As a result, it was observed that the voltages (indicated by black lines) of the battery cells were abruptly reduced. That is, it can be seen that all of the 10 battery cells exploded, as shown in FIG. 10.

In accordance with the above-described configuration and as a result of a variety of extensive and intensive studies and experiments to solve the problems described above, the inventors of the present application have found that, in the case in which a protective film is attached to opposite side edges of a pouch-shaped battery cell, configured to have a structure in which an electrode assembly is mounted in a pouch-shaped battery case made of a laminate sheet, the opposite side edges being adjacent to an upper edge of the pouch-shaped battery cell, from which electrode terminals protrude outward, so as to wrap the opposite side edges of the pouch-shaped battery cell, it is possible to prevent deformation of the pouch-shaped battery cell due to the adhesive force of the protective film when the pouch-shaped battery cell is stored at a high temperature. The present invention has been completed based on these findings.

In accordance with one aspect of the present invention, the above and other objects can be accomplished by the provision of a pouch-shaped battery cell configured to have a structure in which an electrode assembly is received in a pouch-shaped battery case together with an electrolytic solution, wherein the pouch-shaped battery case is made of a laminate sheet including a metal layer and a resin layer, an upper edge of the pouch-shaped battery case, from which electrode terminals protrude outward, and opposite side edges of the pouch-shaped battery case, which are adjacent to the upper edge of the pouch-shaped battery case, are thermally fused to constitute a sealed portion of the pouch-shaped battery case, the opposite side edges of the pouch-shaped battery case being bent perpendicularly from the upper edge of the pouch-shaped battery case toward an electrode assembly receiving unit for receiving the electrode assembly, and a protective film is attached so as to wrap the perpendicularly bent opposite side edges of the pouch-shaped battery case.

In a case in which the protective film is attached to the opposite side edges of the pouch-shaped battery case, which are bent perpendicularly from the upper edge of the pouch-shaped battery case toward the electrode assembly receiving unit, so as to wrap the opposite side edges of the pouch-shaped battery case, as described above, it is possible to prevent the deformation of the sealed portion of the pouch-shaped battery case due to the adhesive component of the protective film. Therefore, when the battery cell is stored at a high temperature for a long period of time, in which case the battery cell may swell, it is possible to restrain the deformation of the electrode assembly, whereby it is possible to prevent the combustion or explosion of the battery cell.

In addition, since the protective film is attached to the outer surface of the pouch-shaped battery case, it is possible to provide a battery cell having improved safety when a related art assembly method is applied to a related art battery cell without using an additional member, such as an external frame.

In an example, the protective film may be attached to the opposite side edges of the pouch-shaped battery case so as to wrap the opposite side edges of the pouch-shaped battery case while having sufficient adhesive strength to restrain the deformation of the electrode assembly due to gas generated in the battery cell when the battery cell swells.

In general, when the battery cell is stored at a high temperature for a long period of time, the electrolytic solution in the pouch-shaped battery case is evaporated, whereby the volume of the battery cell increases. As a result, the battery cell swells. Consequently, the sealed portion of the battery cell may be deformed or perforated. In the case in which the electrode assembly is deformed, a short circuit occurs in the battery cell, whereby the battery cell may catch fire. A protective film having a sufficient adhesive strength to restrain the deformation of the electrode assembly is attached to the pouch-shaped battery case. For example, the protective film is attached to the opposite side edges of the pouch-shaped battery case, which may be easily deformed, so as to wrap the opposite side edges of the pouch-shaped battery case.

In another example, the protective film may be attached to the opposite side edges of the pouch-shaped battery case so as to wrap the opposite side edges of the pouch-shaped battery case while having sufficient adhesive strength to discharge gas, generated in the battery cell when the battery cell swells, out of the pouch-shaped battery case through the upper edge of the pouch-shaped battery case.

If gas is not discharged from the battery cell when the battery cell swells, the battery cell may explode due to the accumulated force of the gas. The protective film may be attached to the opposite side edges of the pouch-shaped battery case so as to wrap the opposite side edges of the pouch-shaped battery case while having sufficient adhesive strength to discharge gas generated in the battery cell through the upper edge of the pouch-shaped battery case.

The protective film may be a single film substrate that is attached to the opposite side edges of the pouch-shaped battery case so as to wrap the opposite side edges of the pouch-shaped battery case. In the case in which a multi-unit protective film is attached to the pouch-shaped battery case so as to be divided into a plurality of units, it is not possible to sufficiently restrain the deformation of the pouch-shaped battery case located at the divided units of the protective film. In the case in which protective films are attached to the pouch-shaped battery case so as to overlap each other, the protective films are unnecessarily wasted. Furthermore, the thickness of the battery cell at the portion of the battery cell at which the protective films overlap each other may increase. For example, the protective film is constituted by a one-unit film substrate in consideration of the safety and miniaturization of the battery cell.

In an another example, the protective film may include a film substrate, made of a polymer resin or a resin composite, and an adhesive layer, provided at one surface of the film substrate. The adhesive layer may be provided at one surface of the film substrate, which is attached to the battery case. The protective film may be attached to the battery case via the adhesive layer. Consequently, it is possible to prevent the deformation of the battery case due to the adhesive force of the adhesive layer attached to the protective film.

The protective film is directly attached to the outer surface of the battery case. When the temperature of the battery cell increases due to a chemical reaction in the battery case, it is necessary to dissipate heat from the battery cell in order to secure the safety of the battery cell. The film substrate may include thermally conductive metal or inorganic powder. Alternatively, a thermally conductive metal or inorganic layer may be at least partially coated on at least one surface of the film substrate.

The battery cell is configured to have a structure in which the opposite side edges of the battery cell, which is adjacent to the upper edge of the battery cell, from which the electrode terminals protrude outward, are bent perpendicularly from the upper edge of the battery cell toward the electrode assembly receiving unit in the state of being thermally fused and in which the protective film is attached to the perpendicularly bent opposite side edges of the battery cell so as to wrap the opposite side edges of the battery cell. For example, the protective film is attached to the outer surface of the battery cell excluding the electrode terminals in order to improve the safety of the battery cell. For example, the protective film may be attached to the outer surface of the pouch-shaped battery case excluding the upper edge of the pouch-shaped battery case while wrapping the outer surface of the pouch-shaped battery case excluding the upper edge of the pouch-shaped battery case.

Alternatively, the protective film may also be attached to the outer surface of the pouch-shaped battery case excluding the upper edge, the lower edge, and the opposite side edges of the pouch-shaped battery case, e.g., the plate-shaped front surface or the plate-shaped rear surface of the battery cell. For example, the protective film may be attached to the front surface and the opposite side edges of the pouch-shaped battery case so as to wrap the front surface and the opposite side edges of the pouch-shaped battery case. Alternatively, the protective film may be attached to the front surface, the opposite side edges, and the lower edge of the pouch-shaped battery case so as to wrap the front surface, the opposite side edges, and the lower edge of the pouch-shaped battery case.

Meanwhile, the protective film may be attached to at least a portion of the rear surface of the pouch-shaped battery case so as to wrap the at least a portion of the rear surface of the pouch-shaped battery case. The protective film may be attached to a portion of the outer edge of the pouch-shaped battery case, including the front surface and the rear surface of the pouch-shaped battery case.

The protective film is attached to a portion of the rear surface of the pouch-shaped battery case having an area equivalent to 10% to 30% of the total surface area of the rear surface of the pouch-shaped battery case so as to wrap the portion of the rear surface of the pouch-shaped battery case. If the protective film is attached to a portion of the rear surface of the pouch-shaped battery case having an area less than 10% of the total surface area of the rear surface of the pouch-shaped battery case so as to wrap the portion of the rear surface of the pouch-shaped battery case, a portion of the protective film extending from the outer edge of the pouch-shaped battery case toward the middle of the pouch-shaped battery case is small, whereby it is difficult to restrain the deformation of the sealed portion of the pouch-shaped battery case. If the protective film is attached to a portion of the rear surface of the pouch-shaped battery case having an area greater than 30% of the total surface area of the rear surface of the pouch-shaped battery case so as to wrap the portion of the rear surface of the pouch-shaped battery case, it is difficult to effectively prevent the deformation of the pouch-shaped battery case in proportion to the increased area of the protective film. That is, the area of the protective film that is attached to the rear surface of the pouch-shaped battery case unnecessarily increases, which is undesirable.

The protective film may be attached to the outer surface of the pouch-shaped battery case in order to protect the battery cell from external impact or to increase the strength of the battery cell. The protective film may be formed so as to have a predetermined thickness. For example, the protective film may have a thickness of 10 to 300 μm, or, in a further example, 30 to 100 μm. If the thickness of the protective film is less than 10 μm, it is difficult for the protective film to serve as a reinforcement member, which is undesirable. If the thickness of the protective film is greater than 300 μm, it is difficult to provide a compact battery cell, which is also undesirable.

Meanwhile, information about the battery cell may be printed on the outer surface of the protective film. Information about the battery cell may be printed on the outer surface of the protective film without using an additional label in order to provide commercial or trade information about the battery cell, whereby it is possible to manufacture a compact battery cell.

In accordance with another aspect of the present invention, a battery pack including the battery cell as a unit cell may be provided.

In accordance with a further aspect of the present invention, a device including the battery pack as a power source may be provided.

For example, the battery pack may be used as a power source for a device requiring the ability to withstand high temperature, a long cycle, high rate characteristics, etc. Examples of the device may include a mobile electronic device, a power tool driven by a battery-powered motor, an electric automobile, such as such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

A middle- or large-sized battery module includes a plurality of battery cells. Consequently, the costs related to members that are used to manufacture each battery cell greatly affect the costs of manufacturing the battery module. Consequently, the secondary battery according to the present invention may be applied to a middle- or large-sized battery module.

The structure and manufacturing method of the device are well known in the art to which the present invention pertains, and a detailed description thereof will be omitted.

In accordance with configurations in accordance with the above description, in a pouch-shaped battery cell according to the present invention, which is configured to have a structure in which an electrode assembly is mounted in a pouch-shaped battery case made of a laminate sheet, a protective film may be attached to opposite side edges of the pouch-shaped battery case, which are adjacent to an upper edge of the pouch-shaped battery case, from which electrode terminals protrude outward, so as to wrap the opposite side edges of the pouch-shaped battery case. Even when the battery cell is stored at a high temperature, therefore, it is possible to prevent the deformation of the battery cell due to swelling of the battery cell that may occur as the result of evaporation of an electrolytic solution, since the protective film has adhesive force.

Consequently, it is possible to prevent the explosion and combustion of the battery cell due to the swelling of the battery cell, whereby it is possible to provide a secondary battery having improved safety.

It will be apparent to those skilled in the art that various modifications and variations can be made in the pouch shaped battery cell having a protective film attached thereto of the present disclosure without departing from the technical idea or scope of the disclosure. Thus, it is intended that the present disclosure cover the modifications and variations of this disclosure provided they come within the scope of the appended claims and their equivalents.

The invention claimed is:

1. A pouch-shaped battery cell, comprising:
a pouch-shaped battery case;
an electrode assembly in the pouch-shaped battery case together with an electrolytic solution, wherein:
the pouch-shaped battery case includes a laminate sheet comprising a metal layer and a resin layer, and
an upper edge of the pouch-shaped battery case, from which electrode terminals protrude outward, and opposite side edges of the pouch-shaped battery case, which are adjacent to the upper edge of the pouch-shaped battery case, are thermally fused to constitute a sealed portion of the pouch-shaped battery case, the opposite side edges of the pouch-shaped battery case being bent perpendicularly from the upper edge of the pouch-shaped battery case toward an electrode assembly receiving unit configured to receive the electrode assembly; and
a protective film that is a one-unit film substrate attached to the pouch-shaped battery case to wrap the perpendicularly bent opposite side edges of the pouch-shaped battery case,
wherein the protective film includes a film substrate and an adhesive layer on one surface of the film substrate,
wherein the protective film is directly attached, via the adhesive layer, to the opposite side edges of the pouch-shaped battery case to wrap the opposite side edges of the pouch-shaped battery case, wherein the adhesive layer is attached on the opposite side edges, and the film substrate is attached on the adhesive layer, and the film substrate is the outermost layer of the protective film,
wherein the protective film is in direct contact with an entirety of the opposite side edges of the pouch-shaped battery, and wherein the protective film is attached to a portion of the rear surface of the pouch-shaped battery case having an area equivalent to 10% to 30% of a total surface area of the rear surface of the pouch-shaped battery case to wrap the portion of the rear surface of the pouch-shaped battery case,
wherein the film substrate comprises a polymer resin or a resin composite, and a thermally conductive powder contained in the film substrate, the thermally conductive powder including a metal or an inorganic powder,
wherein the film substrate comprising the thermally conductive powder is directly attached, via the adhesive layer, to the opposite side edges of the pouch-shaped battery case,
wherein the protective film has a thickness of 10 to 300 µm, and
wherein the protective film is attached to the opposite side edges of the pouch-shaped battery case to have sufficient adhesive strength to restrain deformation of the electrode assembly due to gas generated in the battery cell when the battery cell swells, and to discharge gas, generated in the battery cell when the battery cell swells, out of the pouch-shaped battery case through the upper edge of the pouch-shaped battery case.

2. The pouch-shaped battery cell according to claim 1, wherein the protective film is attached to an outer surface of the pouch-shaped battery case excluding the upper edge of the pouch-shaped battery case while wrapping the outer surface of the pouch-shaped battery case excluding the upper edge of the pouch-shaped battery case.

3. The pouch-shaped battery cell according to claim 1, wherein the protective film is attached to a front surface and the opposite side edges of the pouch-shaped battery case so as to wrap the front surface and the opposite side edges of the pouch-shaped battery case.

4. The pouch-shaped battery cell according to claim 1, wherein the protective film is attached to a front surface, the opposite side edges, and a lower edge of the pouch-shaped battery case so as to wrap the front surface, the opposite side edges, and the lower edge of the pouch-shaped battery case.

5. The pouch-shaped battery cell according to claim 1, wherein information about the battery cell is printed on an outer surface of the protective film.

* * * * *